(12) United States Patent
Schiedegger et al.

(10) Patent No.: US 6,429,371 B2
(45) Date of Patent: Aug. 6, 2002

(54) ELECTRICAL BLOCK

(75) Inventors: Charles E. Schiedegger, Metamora; Aundrea Nurenberg, Brown City; Clyde D. Allen, North Branch; J. Richard Logan, Oxford, all of MI (US)

(73) Assignee: Tapco International Corporation, Plymouth, MI (US)

( * ) Notice: Subject to any disclaimer, the term of this patent is extended or adjusted under 35 U.S.C. 154(b) by 0 days.

(21) Appl. No.: 09/819,494

(22) Filed: Mar. 28, 2001

Related U.S. Application Data

(63) Continuation-in-part of application No. 09/342,572, filed on Jun. 29, 1999, now Pat. No. 6,310,287.

(51) Int. Cl.[7] .................................................. H01J 5/00
(52) U.S. Cl. ........................ 174/50; 174/17 CT; 174/48; 220/3.8; 220/3.9; 439/535
(58) Field of Search .............................. 174/57, 48, 50, 174/58, 135, 63, 53; 220/3.2, 4.02, 3.8, 4.03, 3.94; 248/906; 439/535

(56) References Cited

U.S. PATENT DOCUMENTS

| | | | | |
|---|---|---|---|---|
| 1,208,393 A | * | 12/1916 | Smart ........................ 220/3.94 |
| 2,202,147 A | | 5/1940 | Gerriets ........................ 72/0.5 |
| 3,620,404 A | * | 11/1971 | Grasso ..................... 174/58 X |
| 3,906,145 A | | 9/1975 | Carmichael ................... 174/61 |
| 3,927,785 A | * | 12/1975 | Kinney et al. ................. 174/53 |
| 4,229,916 A | | 10/1980 | White .......................... 52/98 |
| 4,327,841 A | | 5/1982 | Wimberly ..................... 220/18 |
| 4,726,152 A | | 2/1988 | Vagedes et al. ................ 52/28 |
| 4,854,093 A | | 8/1989 | Kellom .......................... 52/28 |
| 4,875,318 A | | 10/1989 | MacLeod et al. ............. 52/211 |
| 4,920,708 A | | 5/1990 | MacLeod et al. .............. 52/60 |
| 5,000,409 A | | 3/1991 | MacLeod et al. ........ 248/205.1 |
| 5,012,043 A | * | 4/1991 | Seymour ..................... 174/57 |
| 5,133,165 A | | 7/1992 | Wimberly ..................... 52/221 |
| D343,825 S | | 2/1994 | Enderby .................... 174/52.1 |
| 5,326,060 A | | 7/1994 | Chubb et al. ............ 248/231.9 |
| 5,397,093 A | | 3/1995 | Chubb et al. ............... 248/544 |
| 5,478,032 A | * | 12/1995 | Miller ...................... 174/48 X |
| 5,578,791 A | | 11/1996 | Bosse, Jr. .................... 174/48 |
| 5,598,670 A | | 2/1997 | Humphrey et al. ........ 52/220.8 |
| 5,722,208 A | | 3/1998 | Humphrey et al. ........ 52/220.8 |
| 5,920,033 A | | 7/1999 | Bosse, Jr. .................... 174/48 |
| 5,952,610 A | | 9/1999 | Bosse, Jr. .................... 174/48 |

* cited by examiner

Primary Examiner—Chau N. Nguyen
Assistant Examiner—Dhiru R Patel
(74) Attorney, Agent, or Firm—Howard & Howard

(57) ABSTRACT

There is provided an electrical block, which cures those deficiencies outlined above of providing a mount, and a separate electrical box. The mount has a base that is adapted to be secured to an exterior surface of a structure. The mount also has a housing extending from the base that has an opening formed therein to receive an electrical box. The electrical box includes a base, plurality walls extending from the base. The walls have an upper portion, which is received in the opening of the housing such that the electrical box is securely retained. One of the walls of the electrical box defines a second opening formed within the electrical box.

14 Claims, 7 Drawing Sheets

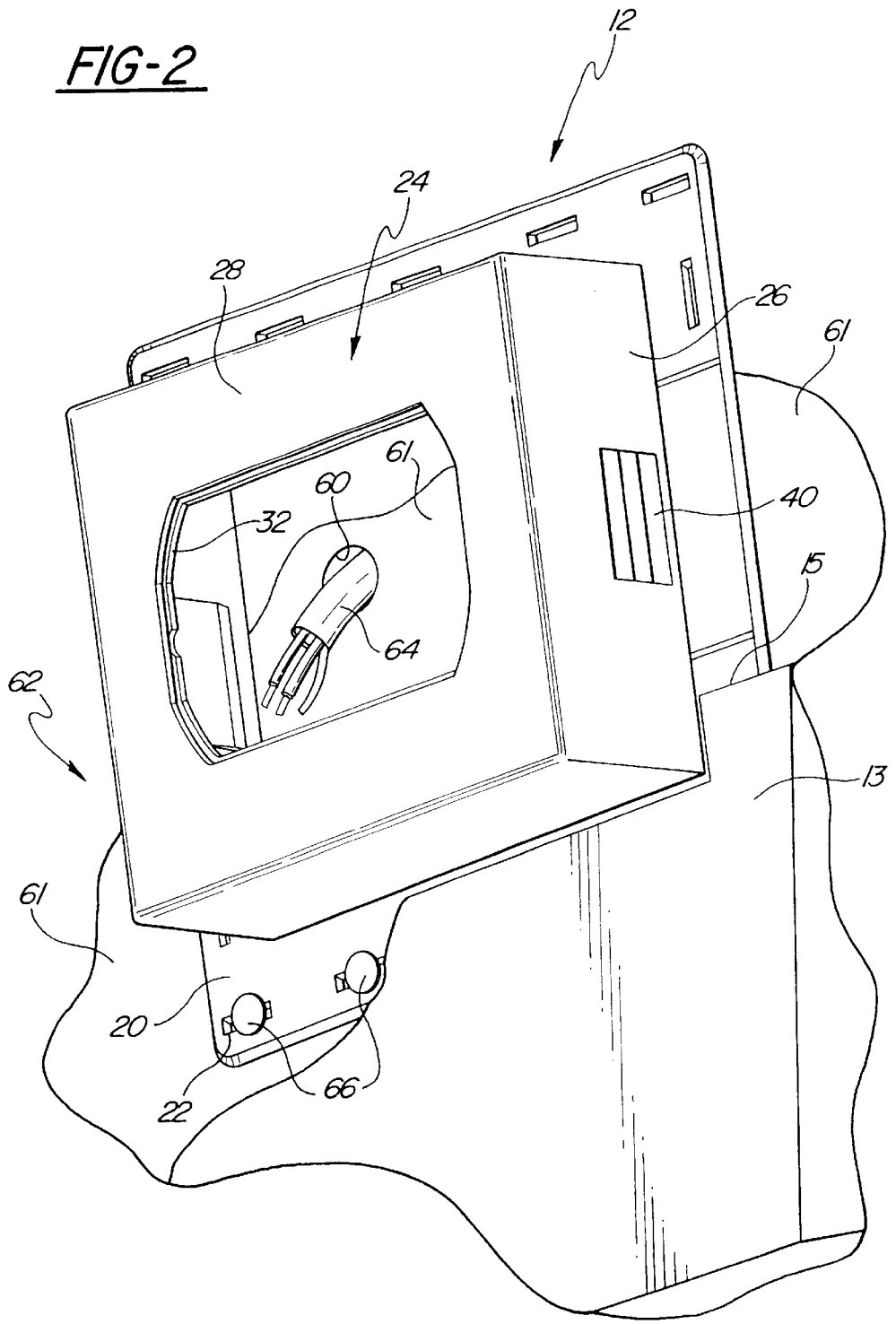

ELECTRICAL BLOCK

CROSS-REFERENCE TO RELATED APPLICATION

This application is a continuation-in-part of U.S. Ser. No. 09/342,572, filed Jun. 29, 1999, now U.S. Pat. No 6,310,287 and also assigned to Tapco International Corporation.

BACKGROUND OF THE INVENTION

This invention generally relates to a multi-piece electrical block for use on an exterior surface of a structure. The assembly supports an electrical outlet or other electrical fixture and is adapted to be used with siding or another exterior surface covering.

Electrical blocks have been developed in the past for use on the exterior surfaces of a structure. The prior electrical blocks attempt to provide a decorative means of attaching an electrical fixture or outlet in a functional manner to structures having an uneven surface, such as a surface to which aluminum or vinyl siding has been attached. Known electrical blocks typically have a mount that is attached directly to the structure. Siding or other decorative covering is then attached to the structure around the mount. A decorative ring or covering may be used which may be either integral with the mount or a separate piece, to cover the edges of the siding that are adjacent to the mount to provide a more aesthetically pleasing appearance. In the art prior to applicants copending application as cross-referenced above, an electrical block has either been integrally formed with the mount or the electrical block has been required to be at least partially recessed into the surface of the structure. These configurations have been found to be deficient.

Electrical box assemblies which are required to be disposed at least partially recessed into the surface of the structure are inconvenient because the hole in the structure that receives the electrical box must be placed in a position in which it does not interfere with the supporting structure underlying the surface.

Designs having electrical boxes that are integrally formed with the mount typically cannot be molded utilizing a plastic material that has good weatherability and color characteristics while providing a design that meets electrical block safety requirements, such as those found in many housing codes.

Previous electrical block assemblies have not included an electrical box wherein the underlying box portion is larger dimensionally than the opening. Another manner of defining this feature is that at least one of the walls of the box does not align with the exterior opening of the block, in order to accommodate fixtures that are too large for electrical boxes having only having walls aligned with the opening.

Accordingly, it is an object of the present invention to provide a multi-piece electrical block that has an electrical box which can accommodate various fixtures through either a first or a second opening formed in the electrical box, and which includes an underlying box portion that is dimensionally larger than the exterior opening of the block. It is also an object of the present invention to provide a multi-piece electrical block that has good weatherability and colored characteristics as well as provides an electrical box that meets suggested safety standards.

SUMMARY OF THE INVENTION

There is provided an electrical block which cures those deficiencies outlined above by providing a mount and a separate electrical box. The mount has a base that is adapted to be secured to an exterior surface of a structure. The mount also has a housing extending from the base with an opening formed receive an electrical box. The electrical box includes a base, a plurality of walls extending from the base, and a mechanism for connecting the electrical box to the base. The electrical box is dimensionally larger than the exterior opening of the base to extend beyond the opening and behind the exterior wall of the base. One of the walls of the electrical box defines a second opening formed within the electrical box.

BRIEF DESCRIPTION OF THE DRAWINGS

The various advantages of the present invention will become apparent to one skilled in the art by reading the following specification and claims and by referencing the following drawings in which:

FIG. 2 is a partial perspective view of a first embodiment of a mount of the present invention attached to an exterior surface to which siding is attached.

DETAILED DESCRIPTION OF THE PREFERRED EMBODIMENT

Figure 1A:
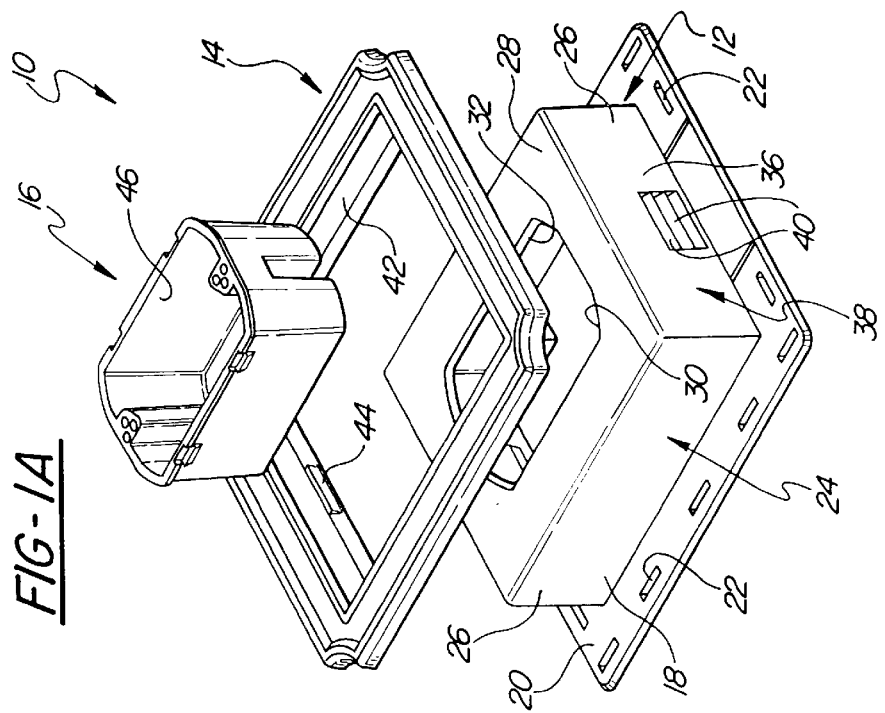
FIG. 1A is an exploded perspective view of the electrical block of the present invention.
Figure 1B:
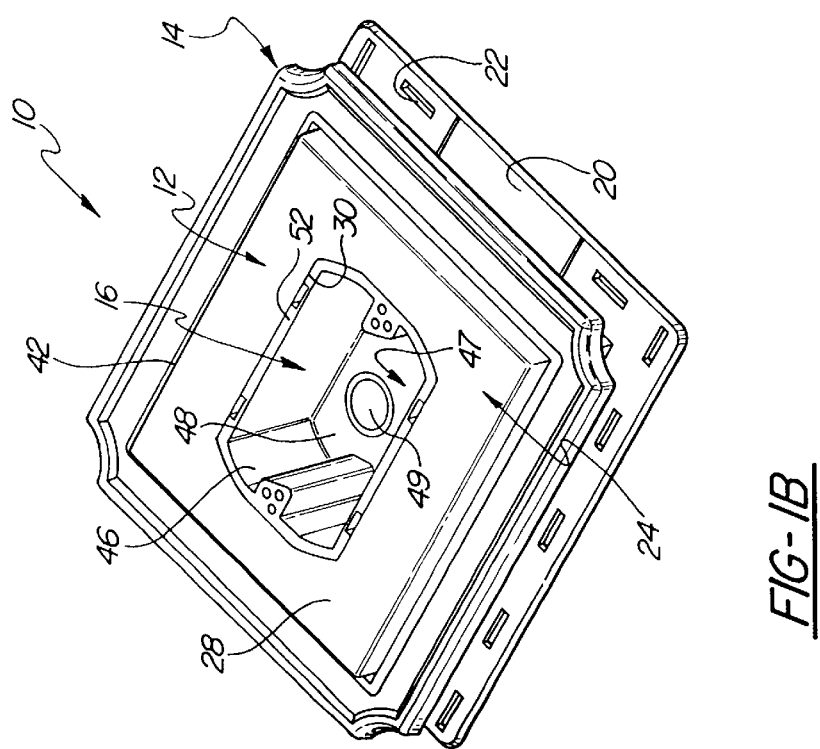
FIG. 1B is a perspective view of a first embodiment of the present invention assembled.

Referring to FIGS. 1A and 1B, a first embodiment of an electrical block trim assembly 10 for use on an exterior surface of a structure is shown. The assembly 10 has three main components: a mount 12, a decorative ring 14, and an electrical box 16. The mount 12 has a base 18, or lower portion, from which a flange 20 extends. The flange 20 has a plurality of holes 22 adapted to accommodate fasteners which are used to attach the mount 12 to the exterior surface. A rectangular housing 24 is defined by a plurality of side walls 26 that extend from the base 18. Although using a rectangular shaped housing simplifies installation of siding around the assembly, it is to be understood that the housing can be any desired shape.

The housing 24 has a top portion 28 disposed between the side walls 26 opposite from the base 18. The top portion 28 has an opening 30 and a ledge 32 formed about the opening 30, which is best shown in FIG. 2. With continuing reference to FIGS. 1A and 1B, the housing 24 has an outer surface 36 with opposing portions 38 on opposite side walls 26, only one of which can be seen in the Figures. Each of the portions 38 has grooves 40 that are adjacent to one another and that run parallel to the base 18. The ledge 32 forms a first interlocking member that is used to secure and retain the electrical box 16 to the mount 12, as described in detail below.

The decorative ring 14 is secured to the mount 12 over the siding to conceal the edges, as best shown in FIG. 2. With continuing reference to FIGS. 1A and 1B, the decorative ring 14 has an rectangular inner perimeter 42 that corresponds to the contour of the housing 24. The inner perimeter 42 has opposing protrusions 44, only one of which can be seen in the Figures, that are aligned with the grooves 40 so that the protrusions 44 interlock with the grooves 40 when the decorative ring 14 is installed over the mount 12.

The electrical box 16 is secured to the mount 12 during installation of the assembly 10. The electrical box 16 has walls 46 with a bottom portion 48 disposed between lower portions of the walls 46, which form a cavity 47 to accommodate wires and other electrical components. At least one knock-out 49 is provided on the bottom portion 48 so that the knock-out 49 may be removed and wires may be passed through the resulting opening and into the electrical box cavity 47.

Figure 3:
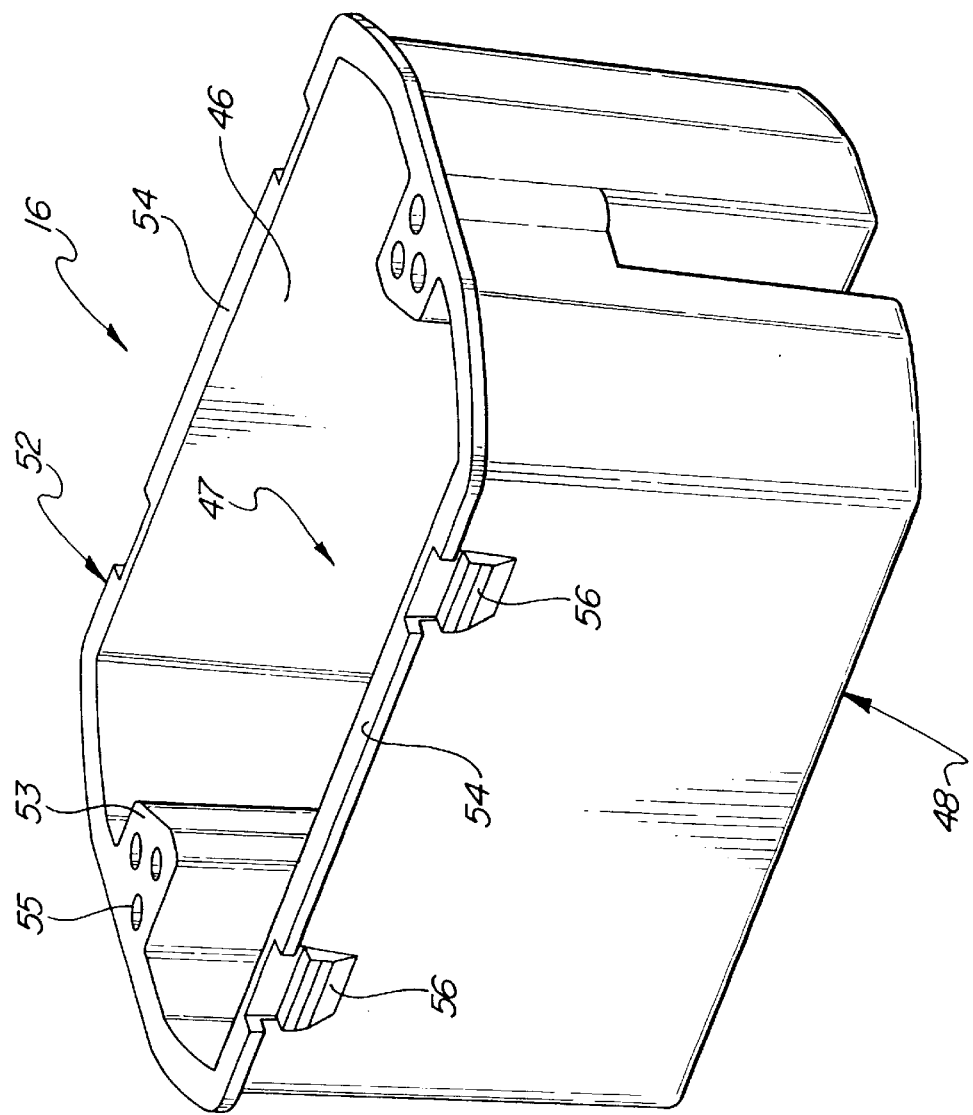
FIG. 3 is an enlarged perspective view of a first embodiment of an electrical box of the present invention.

The electrical box 16 has a second interlocking member that coacts with said first interlocking member and secures said electrical box to the mount 12. As best shown in FIG. 3, the walls 46 have an upper portion 52 with a lip 54 that is securely received and retained within the opening 30 and supported by the ledge 32. The upper portion 52 has at least one tab 56 that is proximate to the lip 54. The ledge 32 forms the first interlocking member and the lip 54 and at least one tab 56 form the second interlocking member. The tabs 56 secure the electrical box 16 to the mount 12 by receiving the ledge 32 between the lip 54 and the tabs 56. In this manner, the electrical box 16 is snapped into the opening 30 in the mount 12. However, it is to be understood that the electrical box 16 may be retained in the opening 30 using any suitable mechanism. For example, a different interlocking configuration may be used, or an interference fit between the electrical box 16 and opening 30 may be used.

Since the mount 12 and the electrical box 16 are separate components of the assembly 10, they may be constructed from different plastic materials. This enables plastic materials having different characteristics to be used. For example, a plastic suitable for electrical boxes may be used when constructing the electrical box, and a plastic suitable for molding in wide variety of colors and which has good weatherability may be used for the mount 12 and decorative ring 14.

Returning now to FIG. 2, exterior covering 13, such as siding 13, surrounds a portion of said mount. The electrical box 16 is interposed between the exterior surface and said top portion.

Referring to FIGS. 4 through 9 there is shown a second embodiment of an electrical block 110 for use on an exterior surface. The electrical block 110 as described has three major components: a base 112, an electrical box 114, and a trim ring 116. The base 112 includes a flange 120 which has a plurality of holes 122 adapted to accommodate fasteners which are used to attach the base 112 to the exterior surface of a building structure. The base further includes a plurality of sidewalls 126, and a top exterior wall 124 disposed between the sidewalls 126. Although the depicted embodiment shows a rectangular shaped housing, it is to be understood that the block 110 may be of other shapes without departing from the inventive aspect of the present invention. The base may also include reinforcement ribs or structures to meet specific safety standards that may be required.

Figure 4:
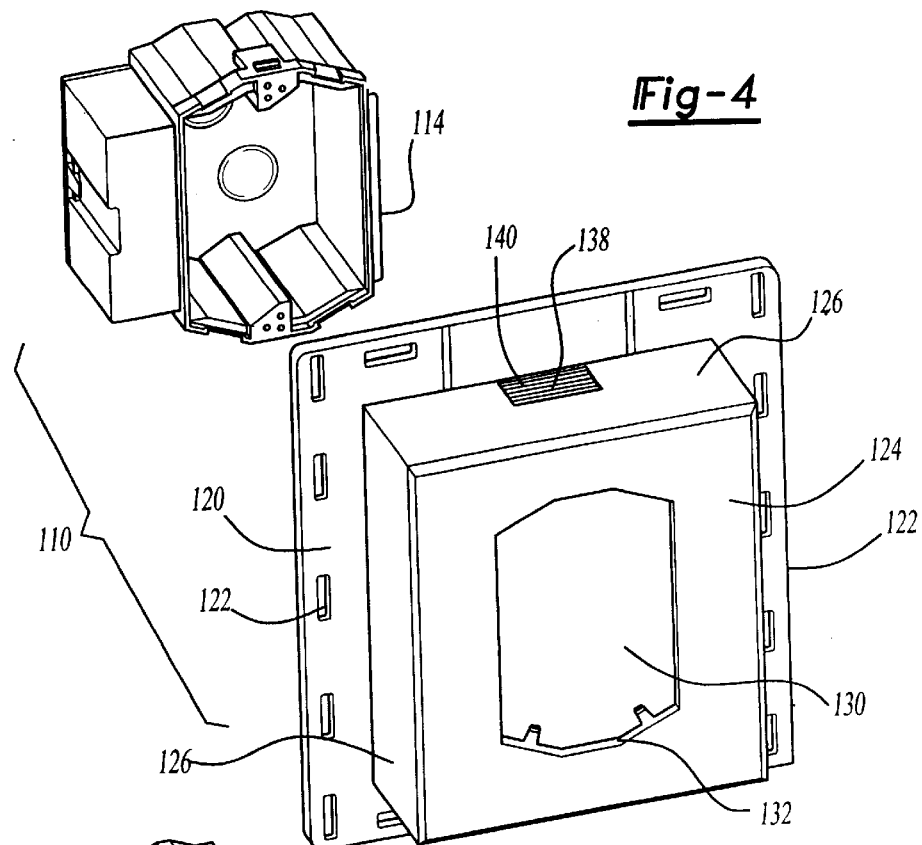
FIG. 4 is an exploded perspective view of a second embodiment of the rear of the electrical block of the present invention.
Figure 5:
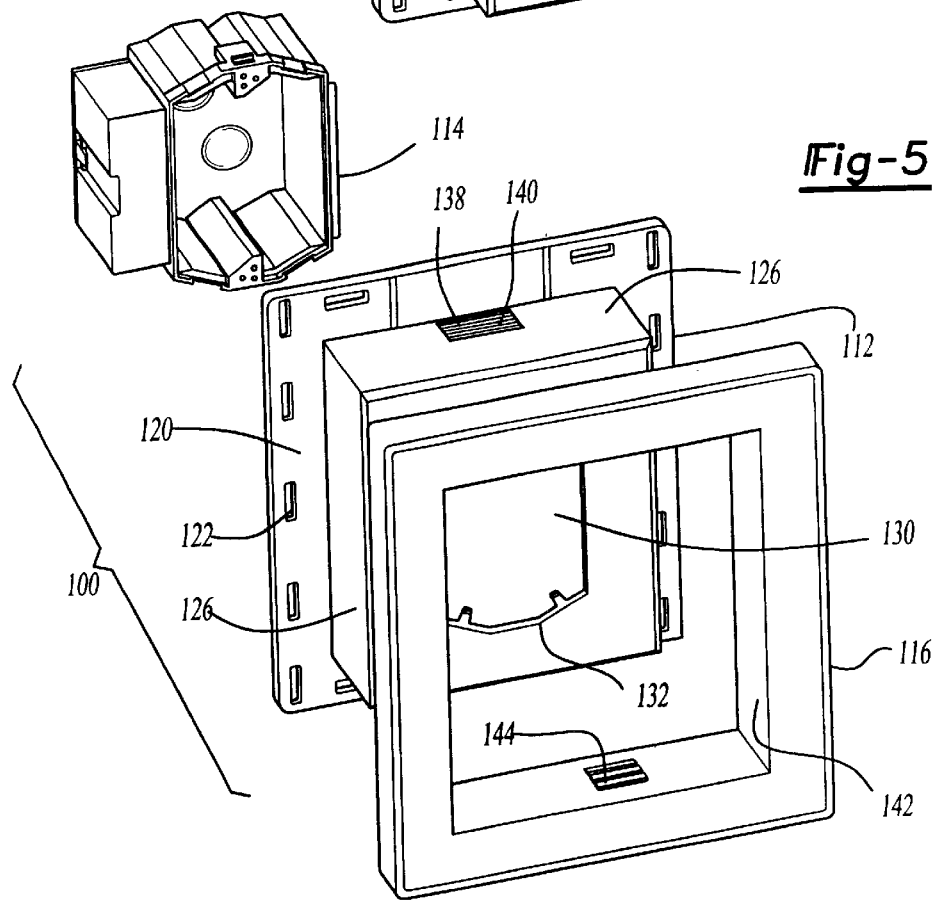
FIG. 5 is an exploded perspective view of a second embodiment of the front of the electrical block of FIG. 4.
Figure 6:
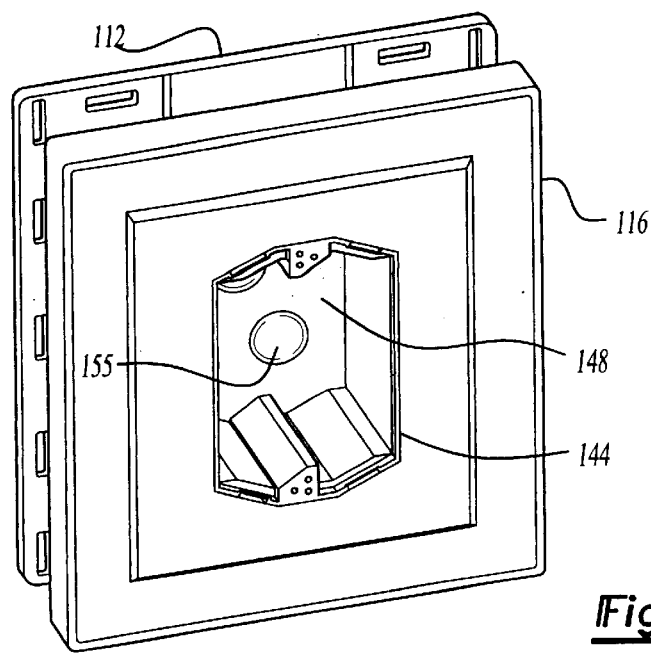
FIG. 6 is a perspective view of a second embodiment of the electrical block when assembled.

With reference to FIGS. 4 and 5, the top exterior wall 124 has an opening 130 and an edge 132 formed about the opening 130. The opening 130 may be centered or offset in relation to the top exterior wall 124 depending upon the specific application. The edge 132 forms a first interlocking member that is used to secure and retain the electrical box 114 to the mount 112. The connection and retention of the electrical box 114 to the base 112 will be described in more detail below. Again, with reference to FIGS. 4 and 5, the base 112 has at least two opposing portions 138 located on opposite sidewalls 126. Each of these portions 138 has grooves 140 that are adjacent to one another and that run parallel to one another.

Figure 7:
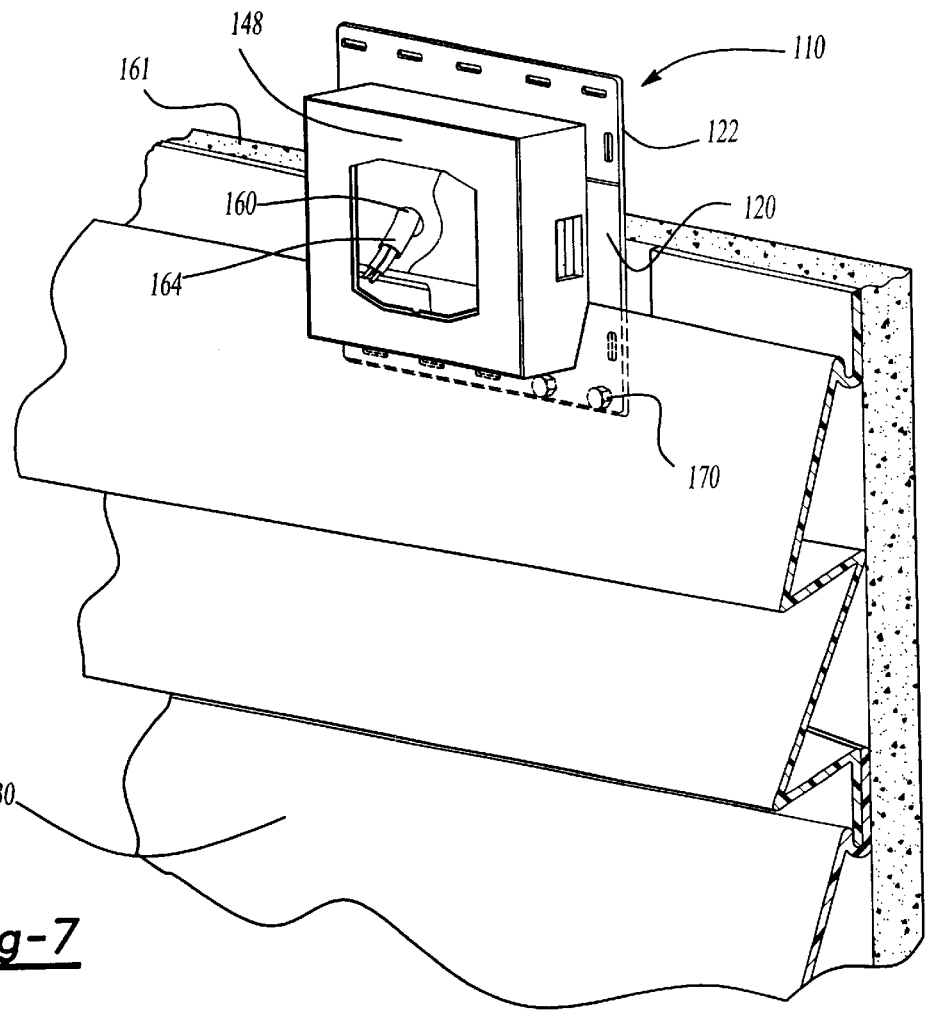
FIG. 7 is an elevational view with sections blown away of a second embodiment of the assembled electrical block installed on the side of a building structure.

A decorative trim ring 116 may be secured to the base 112 over siding or exterior covering 113 to conceal the flanges 120 as best shown in FIG. 7. The decorative trim ring 116 has an inner perimeter 142 that corresponds to the contour of the base 112. The inner perimeter 142 has opposing protrusions 144 that are alignable with the grooves 140 so that the protrusions 144 interlock with the grooves when the decorative ring 116 is installed over the base 112. By providing multiple adjacent grooves 140, the decorative ring 116 may be installed over siding or other exterior coverings of various thicknesses, substantially as described in U.S. Pat. No. 4,920,708.

Figure 8:
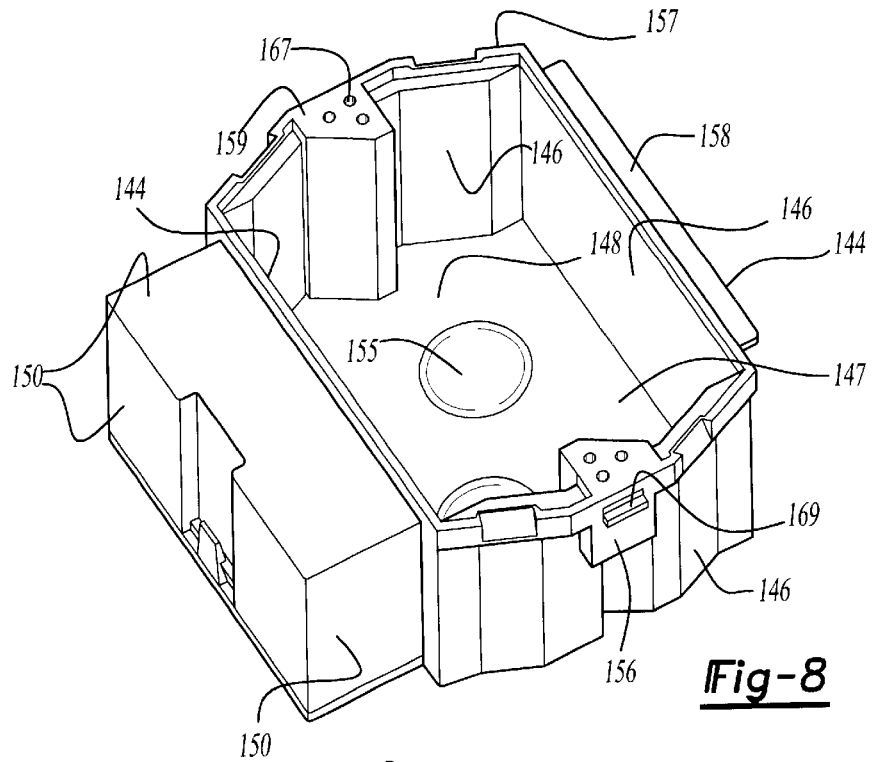
FIG. 8 is a perspective view of a second embodiment of the electrical box separate portion of the electrical block of the present invention.
Figure 9:
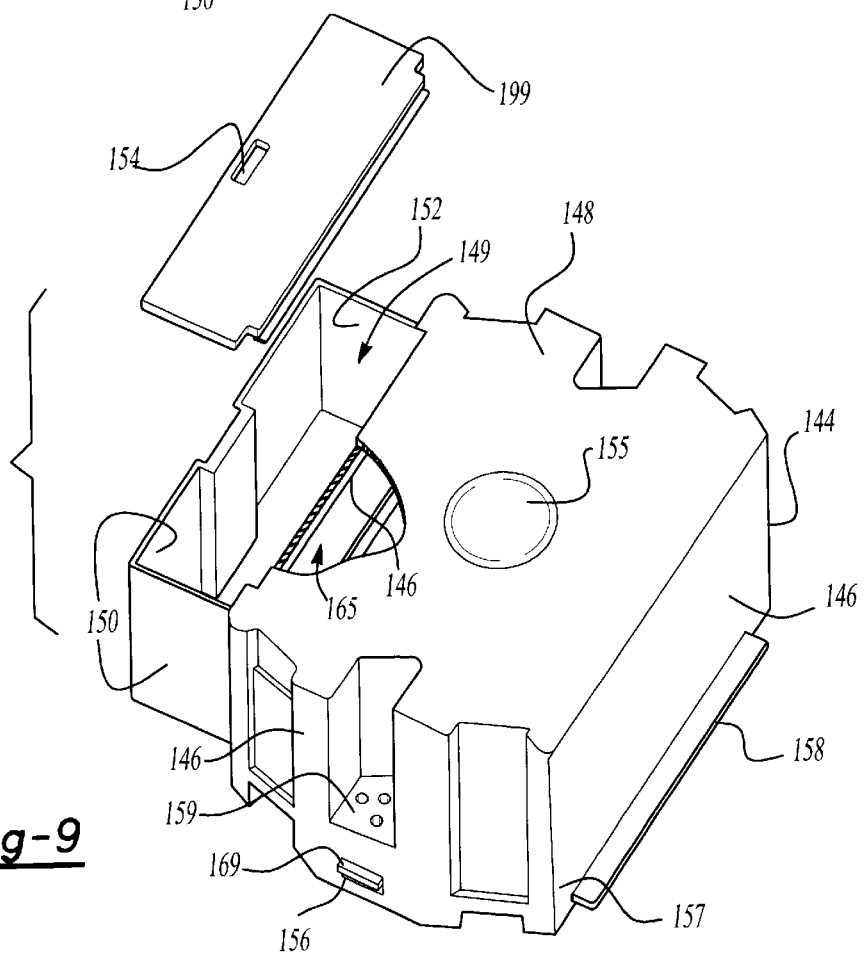
FIG. 9 is a perspective view of a second embodiment of the backside of the electrical box separate of the electrical block of the present invention.
Figure 10:
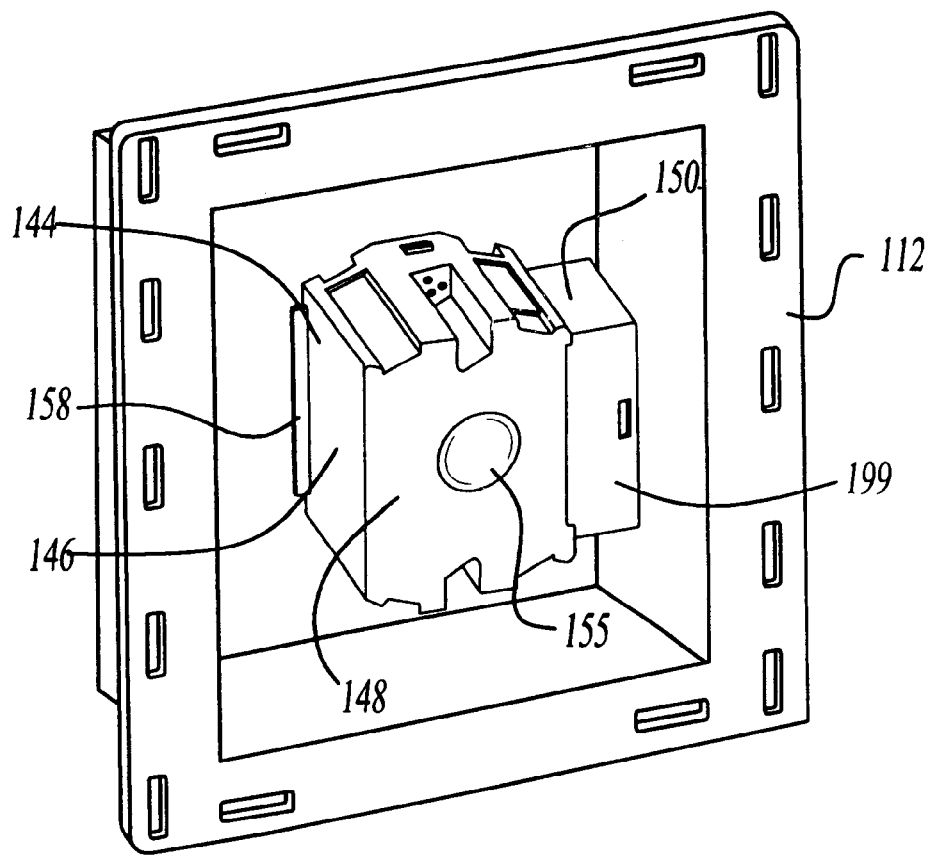
FIG. 10 is a perspective view of a second embodiment of the backside of the assembled electrical block of the present invention.

The electrical box 114 is secured to the base 112 during assembly of the block 110. With reference to figures 8 and 9, the electrical box 114 has a bottom wall 148 disposed between sidewalls 146 which form a cavity 147 to accommodate wires and other electrical components. One of the sidewalls 146 defines a second opening 165, which leads to another cavity 149. The walls 150, define cavity 149 having an access opening covered by a lid 199. As can be seen, the access opening 155 is parallel to the base 148 of the box 114. The lid 199 covering the access opening includes a latch mechanism 154 for holding the lid 199 in place or for releasing the lid 199 when access is desired. There is also included at least one knock out 155 provided on the bottom portion 148 such that the knock out may be removed and wires may be passed through the resulting opening and into the electrical blocks cavity 147.

The electrical box 114 has a second interlocking member 156 that interacts with the first interlocking member 132 formed in the housing 124 and secures the electrical box 114 to the mount 112.

With reference to FIGS. 8 and 9 the walls 146 have an upper portion 157 with a lip 158 that is securely received and retained within opening 130 and supported by the ledge 132. The upper portion 157 has attachment portions 159 with holes 167 to which electrical fixtures may be attached.

The upper portion 157 has at least one tab 169 that is proximate to the lip 158. The ledge 132 forms the first interlocking member and the lip 158 and at least one tab 169 form the second interlocking member 156. The tabs 169 secure the electrical box 114 to the mount 112 by receiving the ledge 132 between the lip 158 and the tabs 169. In this manner, electrical box 114 is snapped into the opening 130 in the mount 112.

With reference to FIG. 7, the invention provides an improved method of installation. A hole 160 is laid in a surface 161 of a structure 162 through which electric wires 164 are fed. The mount 112 is secured to the surface 161 by a plurality of fasteners 170 disposed within the holes 122. An exterior covering or siding 113, is installed on the surface 161 surrounding a portion of the mount 112. The decorative ring (not shown) is installed over the siding 113 and secured to the mount by the protrusions 144 and grooves 140. The electrical box 114 is snapped into the opening 130 so that it is positioned between the exterior surface 161 and the top surface 148. The first and second interlocking members 132 and 156, respectively, secure the electrical box 116 to the mount 112. The wires 164 are received in a cavity 149 provided by the second plurality of walls 150 or through a removed knock out 155.

Because the mount 112 and the electrical box 114 are separate components of a multi-piece electrical box 110 they may be formed from different plastic materials. This relationship allows the electrical box to be molded from one plastic material while the mount 112 may be made with an alternative plastic material. Again, this would allow for a plastic material that meets specifications for electrical boxes to be used, while another plastic material that displays improved characteristics as to weatherability and maintaining its color may be used for the mount and decorative ring.

While preferred embodiments are disclosed, a worker in this art would understand that various modifications would come within the scope of the invention. Thus, the following claims should be studied to determine the true scope and content of this invention.

What is claimed is:

1. A multi-piece electrical box for attaching to a surface of a structure comprising:
   a base having a flange adapted to abut a surface;
   a first plurality of sidewalls extending from said flange, said first plurality of sidewalls including a top exterior wall at a distal end of said first plurality of sidewalls from said flange and having a first opening formed therein;
   an electrical box having a bottom wall and a second plurality of sidewalls extending from said bottom wall of said electrical box, said second plurality of sidewalls having an upper portion wherein said first opening is sized to receive within and adapted to securely retain at least a part of said upper portion, and top exterior wall of said base extending further than said first opening in at least a first direction parallel to a plane formed by said first opening;
   a first of said second plurality of sidewalls defining a second opening therein; and means for securing said electrical box to said base at said first opening.

2. An assembly as set forth in claim 1, including a third plurality of walls extending outwardly from said first of said second plurality of sidewalls.

3. An assembly as set forth in claim 2, wherein said third plurality of walls is integral with said first of said second plurality of sidewalls.

4. An assembly as set forth in claim 2, wherein said third plurality of walls defines an access opening.

5. An assembly as set forth in claim 4, wherein said access opening is parallel to said bottom wall of said electrical box.

6. An assembly as set forth in claim 5, wherein said access opening is coplanar with said bottom wall of said electrical box.

7. An assembly as set forth in claim 4, including a lid covering said access opening.

8. An assembly as set forth in claim 7, including a latch mechanism for holding said lid over said access opening and for releasing said lid from said access opening.

9. An assembly as set forth in claim 7, wherein said lid is coplanar with said bottom wall of said electrical box.

10. An assembly as set forth in claim 1, wherein said base has a first interlocking member and said electrical box has a second interlocking member adapted to interact with said first interlocking member and secure said electrical box to said base when said base receives said electrical box.

11. An assembly as set forth in claim 1, further including a decorative ring having an inner perimeter sized to receive said first plurality of sidewalls.

12. An assembly as set forth in claim 11, wherein said first plurality of sidewalls has an exterior surface with opposing portions, each said opposing portion having a plurality of parallel grooves, said inner perimeter having opposing protrusions that are aligned with said opposing grooves, wherein said protrusions are adapted to interlock with said grooves when said ring receives said first plurality of sidewalls.

13. A multi-piece electrical box for attaching to a surface of a structure comprising:
   a base having a flange adapted to abut a surface;
   a first plurality of sidewalls extending from said flange, said first plurality of sidewalls including a top exterior wall at a distal end of said first plurality of sidewalls from said flange and having a first opening formed therein;
   a decorative ring having an inner perimeter sized to receive said first plurality of sidewalls;
   an electrical box having a bottom wall and a second plurality of sidewalls extending from said bottom wall of said electrical box, said second plurality of sidewalls having an upper portion wherein said first opening is sized to receive within and adapted to securely retain at least a part of said upper portion, said top exterior wall of said base extending further than said first opening in at least a first direction parallel to a plane formed by said first opening;
   a first of said second plurality of sidewalls defining a second opening therein and wherein a third plurality of walls extends outwardly from said first of said second plurality of sidewalls; and
   means for securing said electrical box to said base at said first opening.

14. A multi-piece electrical box for attaching to a surface of a structure comprising:
   a base having a flange adapted to abut a surface wherein said base has a first interlocking member;
   a first plurality of sidewalls extending from said flange, said first plurality of sidewalls including a top exterior wall at a distal end of said first plurality of sidewalls from said flange and having a first opening formed therein;
   a decorative ring having an inner perimeter sized to receive said first plurality of sidewalls;
   an electrical box, said electrical box has a second interlocking member, adapted to interact with said first interlocking member, said electrical box having a bottom wall and a second plurality of sidewalls extending from said bottom wall of said electrical box, said second plurality of sidewalls having an upper portion wherein said first opening is sized to receive within and adapted to securely retain at least a part of said upper portion, said top exterior wall of said base extending further than said first opening in at least a first direction parallel to a plane formed by said first opening; and
   a first of said second plurality of sidewalls defining a second opening therein.

* * * * *